US005819386A

United States Patent [19]

Koppe

[11] Patent Number: 5,819,386

[45] Date of Patent: Oct. 13, 1998

[54] IMPELLER PULLER

[76] Inventor: Rudolf Koppe, 1251 Britannia Road, Campbellville, Ontario, Canada, L0P 1B0

[21] Appl. No.: 810,349

[22] Filed: Mar. 3, 1997

[51] Int. Cl.[6] .......... B23P 19/04

[52] U.S. Cl. .......... 29/261

[58] Field of Search .......... 29/261, 260, 262, 29/259, 258

[56] References Cited

U.S. PATENT DOCUMENTS 4,438,654 3/1984 Chiapetti .......... 269/283

5,341,553 8/1994 Herzhauser .......... 29/261

*Primary Examiner*—Robert C. Watson

*Attorney, Agent, or Firm*—Crossetta & Associates

[57] ABSTRACT

This invention relates to an improved flexible impeller puller, wherein notch and slot means are arranged for adjustably engaging a mating slot and shoulder of gripping jaws to provide improved resistance to wear and misalignment through use, and engaging teeth of the jaws are arranged at an angle to the centerline to assure center hub removal with minimal damage to the hub.

9 Claims, 2 Drawing Sheets

IMPELLER PULLER

This invention relates to an improved impeller puller particularly suitable for the removal of flexible impellers from a shaft of a water pump, such as a water pump in a marine engine, without necessitating the removal of the pump housing from the engine.

BACKGROUND OF THE INVENTION

Many internal combustion engines are liquid cooled and commonly designed to incorporate water pumps as an integral part of the engine and/or drive train. Particularly in marine engine embodiments, the water pump generally comprises a flexible impeller of varying size, dimensions and number of blades. The impeller generally comprises a plurality of slightly resilient curved arms arranged as spokes around a hub, which is generally comprised of an elastomeric material bonded to a metal center, the hub having a central opening for mounting to a shaft which rotates the impeller.

It is not unusual for such impellers to need replacement and/or repair and/or removal for a variety of reasons, with removal being generally time consuming because of the close tolerance positioning of the water pump on the motor, the positioning of the motor in the vehicle and/or boat, the jam fit by which the hub of the impeller is typically mounted to a water pump shaft and/or the effects of corrosion, dirt and the like among the shaft and the impeller. It is not unusual for a technician to be forced to use a pair of flat screw drivers to slowly pry the impeller from the shaft, creating the danger of damage to the housing and in many instances so damaging the impeller as to make it non-repairable, non-rebuildable or even non-reusable once removed.

Various pullers have been proposed for use in removal of impellers from their supporting shaft but have been found unsuitable for a variety of reasons and have not found particular commercial acceptance for use as flexible impeller pullers in the industry. U.S. Pat. No. 5,341,553 discloses one of the better impeller pullers available in the industry, but though it purports to solve the problem of attaining general universal application and ease of use for flexible impeller removal from water pump shafts, it has been found problematic in that it can create too much damage to the flexible impeller particularly through being in misalignment during removal of the impeller, thus tending to further jam the impeller on the shaft and making the removal process difficult, and technically illusive to even an experienced technician.

It is a primary object of the present invention to provide an improved impeller puller which will facilitate the removal of flexible impellers from a water pump positioned in a difficult to reach locations.

It is a further object of the invention to improve the impeller puller of U.S. Pat. No. 5,341,553 and resolve the difficulty encountered with misalignment during the removal process.

It is another object of the invention to provide an improved impeller puller which is more easily aligned and more certain in operation to maintain alignment for the effective removal of a flexible impeller with minimal damage to the impeller.

It is still another object of the invention to provide an improved impeller puller which is easy to manipulate and utilize by an inexperienced technician.

These and other objects of the invention will be come apparent in the following recitation of the invention.

SUMMARY OF THE INVENTION

The present invention comprises an improved flexible impeller puller of the type disclosed in U.S. Pat. No. 5,341,553, to remove flexible impellers of varying dimension and number of blades.

The impeller puller of the present invention comprises a centrally disposed linkage head, having a threaded axial bore therethrough for mounting an elongate threaded screw member. First and second "L" shaped clamp members, comprising first and second legs constituting the "L" shape, are disposed along opposite sides of the linkage head, each being hingedly secured along a first leg to the linkage head by two sets of two opposing elongate link members. The link members are positioned such that each of the second legs of the first and second clamp members are hingedly movable between a retracted and clamped position.

Each of the second legs of the first and second clamp members comprise a slot along about their length for adjustably mounting an end of a mating slotted and shouldered gripping jaw. By slotted and shouldered gripping jaw is meant that each gripping jaw comprises a slot at an end portion thereof arranged to form at least two shoulders on the gripping jaw for engaging a mating slot of the second leg of a clamp member for slidably mounting the gripping jaw, adjustably along about the length of the second leg. Adjustable mounting of the gripping jaw to the clamp members is by screw means, engaged through a plurality of holes arranged along the length of the second leg of the clamping members, which further engages a threaded hole in the end portion of the gripping jaw. In a preferred arrangement, the slots in both the gripping jaw and the clamping members are machined to close mating tolerance to enable close fitted shoulder engagement of the end portion of the shoulders of the gripping jaw to the shoulders of the second leg of the clamping member along the length of the second leg. The threaded hole of the end portion of the gripping jaw is positioned away from a center axis of the gripping jaw and toward a center axis of the linkage head, e.g. the central axis of the device.

Each gripping jaw is elongated, arranged at an angle to the central axis of the device and comprises a plurality of confronting teeth arranged to extend toward an axis of the threaded screw member such that the teeth are positioned to engage an elastomeric material comprised on the central hub of a flexible impeller arranged along about a central axis of the device.

The combination of close mating tolerance among shoulders and slots in the second leg of the clamp member and corresponding gripping jaw end portion, together with off-center mounting screw attachment of the jaws through the holes, provides multiple engaging shoulders for assuring fixed positioning of the jaws in respect to the clamping members, while reducing sheering stress on the mounting screw means which is occasioned by the forces imposed upon the puller in removal of the impeller.

In pullers of the type of the present invention, the elongate screw member engages the fixed shaft of the water pump and the link head is forced axially along an axis of the shaft of the water pump, away from the shaft. The gripping jaws are engaged with the hub and as the link head is forced away, the gripping jaws are forced to compress against the hub by the movement of the link members. The hub resists compression and significant sheer force is placed upon the ends of the gripping jaw at the adjusting point which enables use with variable diameter hubs, i.e. at the point where the jaws engage a clamping member.

Variations in tolerance at such adjusting points provide play in the movement of the gripping jaw which is exacerbated along the length of the gripping jaw, such that as the force causing compression of the jaws against the hub increases, the point along the jaw at which compression is greatest moves from hub engaging means at the extreme end of the jaw, toward hub engaging means at the point of attachment of the jaw with the clamping member. In the same manner, the point along the hub at which greatest pulling force is being exerted is the point of greatest compression and thus as the compression force moves toward the clamping member the greatest pulling force exerted upon the hub moves toward the exterior end of the hub and away from the interior end of the hub.

The result is that in pullers of such type, teeth or the like means which are arranged to press into a resilient surface of the hub closest to the exterior end of the hub and may pierce the elastomeric covering of the hub and exert a misaligned force on the hub. The misalignment requires greater pulling force than otherwise necessary to remove the hub and typically the teeth arranged at the exterior end of the hub end up ripping away elastomeric material at the exterior end of the hub and the pulling process fails.

In the present invention, the mating slots among the clamping members and the gripping jaws provide increased surface-to-surface resistance to the sheering force at the mounting of the gripping jaws to the clamping members and the positioning of the screw mounting means mitigates against wear of the screw mounting, occasioned by adjustment changes for varying hub dimensions, becoming a factor in variation of tolerances. Similarly, the defined angle of the plane of the plurality of engaging teeth of the jaws, assures the teeth arranged at the extreme end of the jaws will provide more compression force to the elastomeric covering of the hub at the interior end of the hub than the teeth on the jaws which engage at the exterior end of the hub, thus assuring alignment of the pulling force and assuring reduction of piercing and/or ripping effect on the elastomeric material at the exterior end of the hub.

For a fuller understanding of the nature of the present invention, reference should be made to the following detailed description taken in connection with the accompanying drawings.

DETAILED DESCRIPTION OF THE INVENTION

Figure 1:
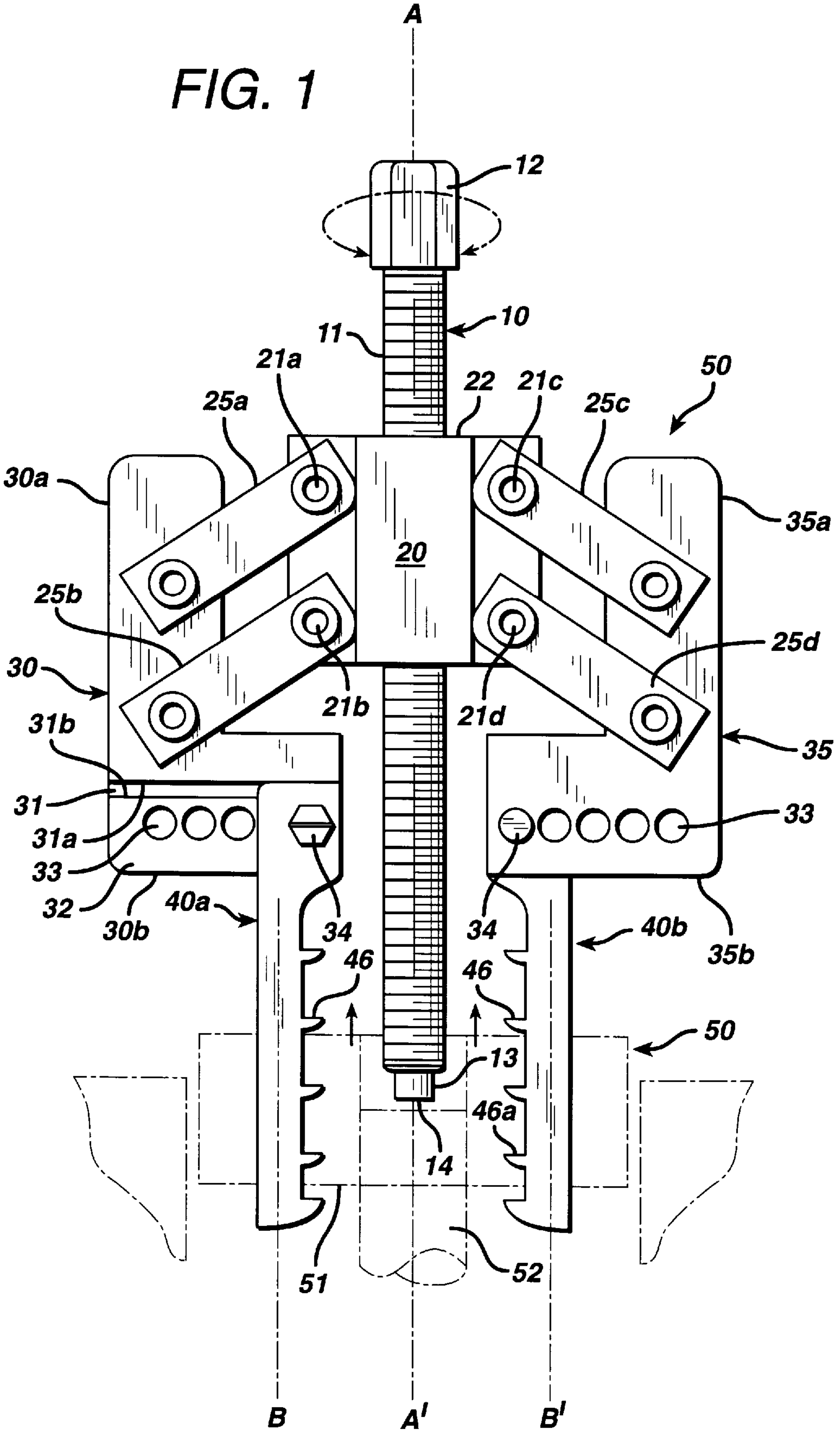
FIG. 1 is a front view of an impeller puller of the invention illustrating positioning in respect to pulling an impeller.

Referring now to the figures, therein is illustrated an impeller puller 50 of the invention comprising a centrally disposed linkage head 20, having a threaded axial bore therethrough 22, for mounting an elongate screw member 10, having threads 11 for adjustably screwing the screw member into mating threads, not shown, in the axial bore of the linkage head. Screw member 10 is illustrated as comprising at its proximal end, an hexagonal head 12 to enable engaging a wrench for rotation of the screw member the like and at its distal end a non threaded end 13 with a center point 14 for engaging and maintaining centered position on an end of a shaft of a water pump.

Figure 2:
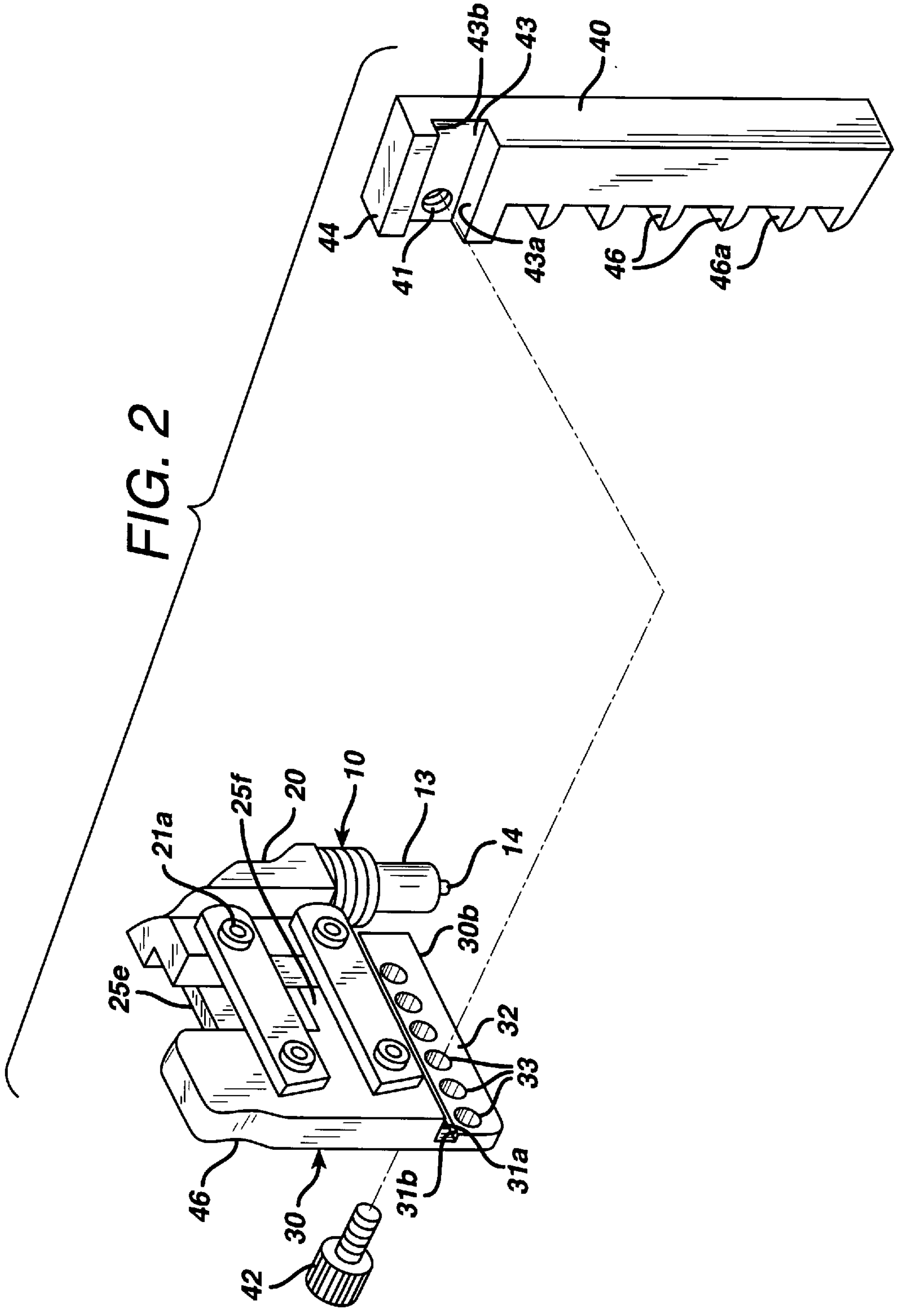
FIG. 2 is a partial, exploded view of an impeller puller, particularly illustrating attachment of a gripping jaw to a clamping member.

Elongate link members 25*a–d* are hingedly secured at one end to linkage head 20 by means of pins 21*a–d*. Matching link members 25*e*,25*f*, as shown in FIG. 2, are secured to linkage head 20 on the reverse side of the linkage head by means of pins (not shown) in a mirror arrangement. Clamp members 30 and 35 are illustrated as "L" shaped and including first legs 30*a* and 35*a* and second legs 30*b* and 35*b* respectively. The first legs 30*a* and 35*a* of the clamp members are hingedly secured to link members 25*a–b* and 25*c–d* respectively by means of pins 21*a–d*. Thus can be seen that the link members, clamp members and linkage head are secured in a hinged parallelogram arrangement which enables movement of the clamping members toward and away from the linkage head, e.g. clamping and retracted, while maintaining same in an axis about parallel to the center axis A–A' of the linkage head.

Each of second legs 30*b* and 35*b* of clamp members 30 and 35 respectively comprise stabilizing slot 31 and mounting notch 32 along about their length which create shoulders 31*a* and 31*b*. Mounting notch 32 comprises a plurality of aligned holes 33, for adjustably mounting an end of a mating slotted gripping jaw 40*a* and 40*b*. In FIG. 1, aligned holes 33 are illustrated as threaded with gripping jaws 40*a* and 40*b* being mounted to second legs 30*b* and 35*b* by means of a attachment screw member 34 which engages a mating hole in the proximal end of the gripping jaws and having a threaded end for engaging threaded holes 33. In FIG. 2, aligned holes 33 are illustrated as non-threaded and as mating with threaded hole 41 of gripping jaw 40 and being mounted by threaded screw member 42.

Gripping jaws 40*a* and 40*b* comprise slot 43 which has shoulders 43*a* and 43*b*. When mounted to a clamping member, end 44 of the gripping jaw slidably engages shoulder 31*a* of slot 31 of the clamping member, shoulder 43*b* of the gripping jaw slidably engages shoulder 31*b* of the clamping member and shoulder 43*a* of the gripping jaw slidably engages the butt end of leg 30*b*, providing three generally flat engaging surfaces to receive and resist the sheering force created during the pulling process. The attachment screw member acts primarily to retain the shoulders in mating alignment and not in resisting sheering force, thus significantly extending the usable life of the puller.

In the puller of the invention, the engaging end of the teeth on a gripping jaw are arranged in a straight line, which is aligned at an angle to the centerline of the puller. In FIG. 1, this is illustrated by centerlines B and B' of the jaws being angled to centerline A–A' of screw member 10 and teeth ends 46 being equidistant from centerlines B and B'. Further, upper surface 46*a* of the teeth is preferably aligned at an angle from the perpendicular of the centerline A–A' of the puller. Generally, the angle of a straight line along the ends of the teeth to centerline A–A' is about 1° to about 10° and preferably from about 1° to about 7°. The angle of upper surface 46*a* is about 1° to about 15° and preferably about 1° to about 10° from the perpendicular to centerline A–A'.

In a preferred arrangement of the invention, the link members, clamp members and linkage head are secured in a hinged parallelogram arrangement which enables movement of the clamping members toward and away from the linkage head, e.g. a clamping and retracted position, while maintaining essentially the same relative relationship of the axes of both the clamping member and gripping jaws to the center axis A–A' of the linkage head. The central axis of the gripping jaws may be parallel or angled from center axis A–A' but the ends of the teeth must be in an alignment which is at an angle to the center axis A–A'. In a preferred embodiment the central axis of the gripping jaws is angled from center axis A–A' and the ends of the teeth are aligned parallel to the center axis of the gripping jaws. In a preferred embodiment, the upper surface of the teeth extend along a line about perpendicular from an angled centerline of the gripping jaws, with the bottom surface being beveled at from about 30 to about 50 degree angle, preferably about 35 to about 45 degrees to the upper surface to provide an edge at the end of the tooth. In a preferred embodiment seven teeth are provided with their ends being from about 8.5 to about 9.5 mm apart.

FIG. 2, illustrates a preferred embodiment comprising a rounded notch 46 along leg 30*a* and 35*a*(not shown) of clamping members 30 and 35(not shown). Such notch enables convenient gripping of the puller by the technician during installation and removal of the puller.

In operation, the gripping jaws 40*a* and 40*b* are arranged to straddle the hub 51 of impeller 50, with center point 14 engaging a center notch in the water pump shaft 52. Screw member 10 is turned to engage a pulling force and extract the impeller from the shaft.

I claim:

1. In an adjustable impeller puller comprising:

a linkage head, having an axial threaded bore extending therethrough and means on opposite sides for hingedly mounting a first end of a linking member;

an elongate threaded screw member, extending axially through said threaded bore of said linkage head and arranged to be adjustably positioned therein and having an end for engaging a shaft upon which a flexible impeller is disposed;

first and second clamp members, disposed opposite from one another an opposite sides of said linkage head, each comprising means for hingedly mounting second ends of a plurality of linking members, and means for adjustably mounting gripping jaws spaced from a centerline of said axial bore;

four sets of two opposing elongate linking members, each linking member comprising means at a first end for hingedly mounting to said linkage head and means at a second end for hingedly mounting to a clamp member, two sets of said linking members being mounted among said first clamp member and said linkage head and two sets of said linking members being mounted among said second first clamp member and said linkage head;

first and second elongate gripping jaws, adjustably mounted at a proximal end to said first and second clamp members respectively, said gripping jaws extending to a distal end and having confronting toothed inner surfaces with teeth ends arranged for engaging a central hub of a flexible impeller;

the improvement comprising, said clamp members comprising notch and slot means arranged for adjustably engaging a mating slot and shoulder of said gripping jaws along at least three sets of mating surfaces along planes which cross the centerline of said axial bore, and said ends of confronting teeth on said inner surface of a gripping jaw being arranged along a plane in fixed alignment, angled to be nearer said centerline at said distal end.

2. The impeller puller of claim 1 wherein said plane of said ends of said teeth is angled from about 1 to about 10 degrees from parallel to said centerline.

3. The impeller puller of claim 2 wherein said plane of said ends of said teeth is angled from about 1 to about 7 degrees from parallel to said centerline.

4. The impeller puller of claim 3 comprising seven teeth on a gripping jaw.

5. The impeller puller of claim 4 wherein said teeth are beveled from about 30 to about 50 degrees to form an edge at their end.

6. The impeller puller of claim 2 wherein linking members of a set are mounted opposite each other and said means for hingedly mounting said linking members comprises pin means which extends through holes in said linking members and said clamp member.

7. The impeller puller of claim 6 wherein said linking members, clamp members and linkage head are secured in a hinged parallelogram which maintains the clamp member in essentially the same relative axial relationship with said centerline of said axial bore during clamp member movement.

8. The impeller puller of claim 2 wherein engagement of said slots and shoulders is maintained by screw attachment means.

9. The impeller puller of claim 1 wherein an upper surface of a tooth is in a plane arranged about 1 to about 10 degrees from a perpendicular to said centerline.

* * * * *